US011332262B2

(12) United States Patent
Kiewit et al.

(10) Patent No.: US 11,332,262 B2
(45) Date of Patent: May 17, 2022

(54) APPARATUS AND METHODS FOR MARINE CAPTURE OF A UAV USING WATER FOR BRAKING AND DAMPING

(71) Applicant: Insitu, Inc., Bingen, WA (US)

(72) Inventors: Jesse D. Kiewit, Bingen, WA (US); John Richard Wong, Klickitat, WA (US)

(73) Assignee: THE BOEING COMPANY, Chicago, IL (US)

( * ) Notice: Subject to any disclaimer, the term of this patent is extended or adjusted under 35 U.S.C. 154(b) by 566 days.

(21) Appl. No.: 16/404,039

(22) Filed: May 6, 2019

(65) Prior Publication Data
US 2020/0354081 A1 Nov. 12, 2020

(51) Int. Cl.
 *B64F 1/02* (2006.01)
 *B63B 35/50* (2006.01)
 *B64C 39/02* (2006.01)

(52) U.S. Cl.
 CPC ............ *B64F 1/0299* (2020.01); *B63B 35/50* (2013.01); *B64C 39/024* (2013.01); *B64C 2201/182* (2013.01)

(58) Field of Classification Search
 CPC ......... B63B 35/50; B63B 35/53; B64F 1/029; B64F 1/0299; B64F 1/027; B64F 1/02;
 (Continued)

(56) References Cited

U.S. PATENT DOCUMENTS 2,841,107 A * 7/1958 Scheider ................. B63B 35/50
 114/261
6,264,140 B1 * 7/2001 McGeer .................. B64F 1/029
 244/110 F
(Continued)

FOREIGN PATENT DOCUMENTS

EP 1185457 3/2002
EP 2186728 5/2010
(Continued)

OTHER PUBLICATIONS

European Patent Office, "Extended European Search Report," issued in connection with European Patent Application No. 20168760.5, dated Oct. 2, 2020, 6 pages.

*Primary Examiner* — Christopher D Hutchens
(74) *Attorney, Agent, or Firm* — Hanley, Flight & Zimmerman, LLC

(57) ABSTRACT

Apparatus and methods for marine capture of an unmanned aerial vehicle (UAV) using water for braking and damping are described. An example capture device is for capturing a UAV aboard a marine vessel located in a body of water. The capture device includes a mounting frame and a capture frame. The mounting frame is configured to be coupled to the marine vessel. The capture frame is configured to be rotatably coupled to the mounting frame. The capture frame is rotatable relative to the mounting frame about an axis of rotation. The capture frame includes a braking member configured to be submerged in the body of water. The braking member is configured to oppose rotation of the capture frame relative to the mounting frame based on a braking force to be applied to the braking member by the body of water.

20 Claims, 4 Drawing Sheets

(58) Field of Classification Search
CPC .. B64C 2201/182; B64C 25/68; B64C 39/024
USPC .......................................... 244/110 C, 110 F
See application file for complete search history.

(56) References Cited

U.S. PATENT DOCUMENTS

| | | | |
|---|---|---|---|
| 7,059,564 B2* | 6/2006 | Dennis | B63B 27/26 |
| | | | 244/110 F |
| 7,219,856 B2* | 5/2007 | Watts | B64F 1/02 |
| | | | 244/110 F |
| 10,518,902 B2* | 12/2019 | Briggs | B64C 39/024 |
| 10,800,547 B1* | 10/2020 | McGann | B64F 1/027 |
| 2016/0016675 A1* | 1/2016 | Zwaan | B64F 1/025 |
| | | | 244/110 C |

FOREIGN PATENT DOCUMENTS

| | | |
|---|---|---|
| JP | 2014043198 | 3/2014 |
| WO | 0075014 | 12/2000 |

\* cited by examiner

US 11,332,262 B2

APPARATUS AND METHODS FOR MARINE CAPTURE OF A UAV USING WATER FOR BRAKING AND DAMPING

FIELD OF THE DISCLOSURE

This disclosure relates generally to apparatus and methods for marine capture of an unmanned aerial vehicle (UAV) and, more specifically, to apparatus and methods for marine capture of a UAV using water for braking and damping.

BACKGROUND

UAVs can be captured aboard (e.g., alongside, onto and/or on) marine vessels (e.g., boats, ships, carriers, etc.) by engaging and/or coupling (e.g., hooking) the in-flight UAV to a capture line (e.g., a rope) of a UAV capture system deployed on the marine vessel. In some instances, the capture of the UAV is a recovery operation performed subsequent to the UAV being launched from the marine vessel, and/or subsequent to the UAV completing a mission.

Existing UAV capture systems are heavy and complex structures that rely on unyielding strength as a mechanism to capture the UAV. Such capture systems are typically assembled, deployed and operated by a relatively large team of individuals, often requiring motor assist to raise the capture system into an operable position. The unyielding strength of such capture systems results in the use of heavy structural members. These heavy structural members are typically attached to a heavy base. Since these capture systems have unyielding strength, they necessitate the use of bungees, payout of the capture line, or nets to dissipate the capture energy. The bungees, payout lines, and other devices used to manage or provide braking force and damping increase the mechanical complexity of these capture systems.

Capture energy can be further dissipated by reducing the relative speed of capture. For example, marine capture of a UAV can occur while the marine vessel is in motion, with the course (e.g., the flight path) of the UAV set in-line and in the same direction as the marine vessel, thereby reducing the relative speed of the capture (e.g., the speed of the UAV relative to the speed of the marine vessel carrying the capture system).

SUMMARY

Apparatus and methods for marine capture of a UAV using water for braking and damping are disclosed. In some examples, a capture device for capturing an unmanned aerial vehicle (UAV) aboard a marine vessel located in a body of water is disclosed. In some disclosed examples, the capture device comprises a mounting frame and a capture frame. In some disclosed examples, the mounting frame is configured to be coupled to the marine vessel. In some disclosed examples the capture frame is configured to be rotatably coupled to the mounting frame. In some disclosed examples, the capture frame is rotatable relative to the mounting frame about an upwardly-oriented axis of rotation. In some disclosed examples, the capture frame includes a braking member configured to be submerged in the body of water. In some disclosed examples, the braking member is configured to oppose rotation of the capture frame relative to the mounting frame based on a braking force to be applied to the braking member by the body of water.

In some examples, a method for capturing an unmanned aerial vehicle (UAV) aboard a marine vessel located in a body of water is disclosed. In some disclosed examples, the method comprises capturing the UAV with a capture device coupled to the marine vessel. In some disclosed examples, the capture device includes a mounting frame and a capture frame. In some disclosed examples, the mounting frame is coupled to the marine vessel. In some disclosed examples, the capture frame is rotatably coupled to the mounting frame. In some disclosed examples, the capture frame is rotatable relative to the mounting frame about an upwardly-oriented axis of rotation. In some disclosed examples, the capture frame includes a braking member submerged in the body of water. In some disclosed examples, the braking member opposes rotation of the capture frame relative to the mounting frame based on a braking force applied to the braking member by the body of water.

Figure 1:
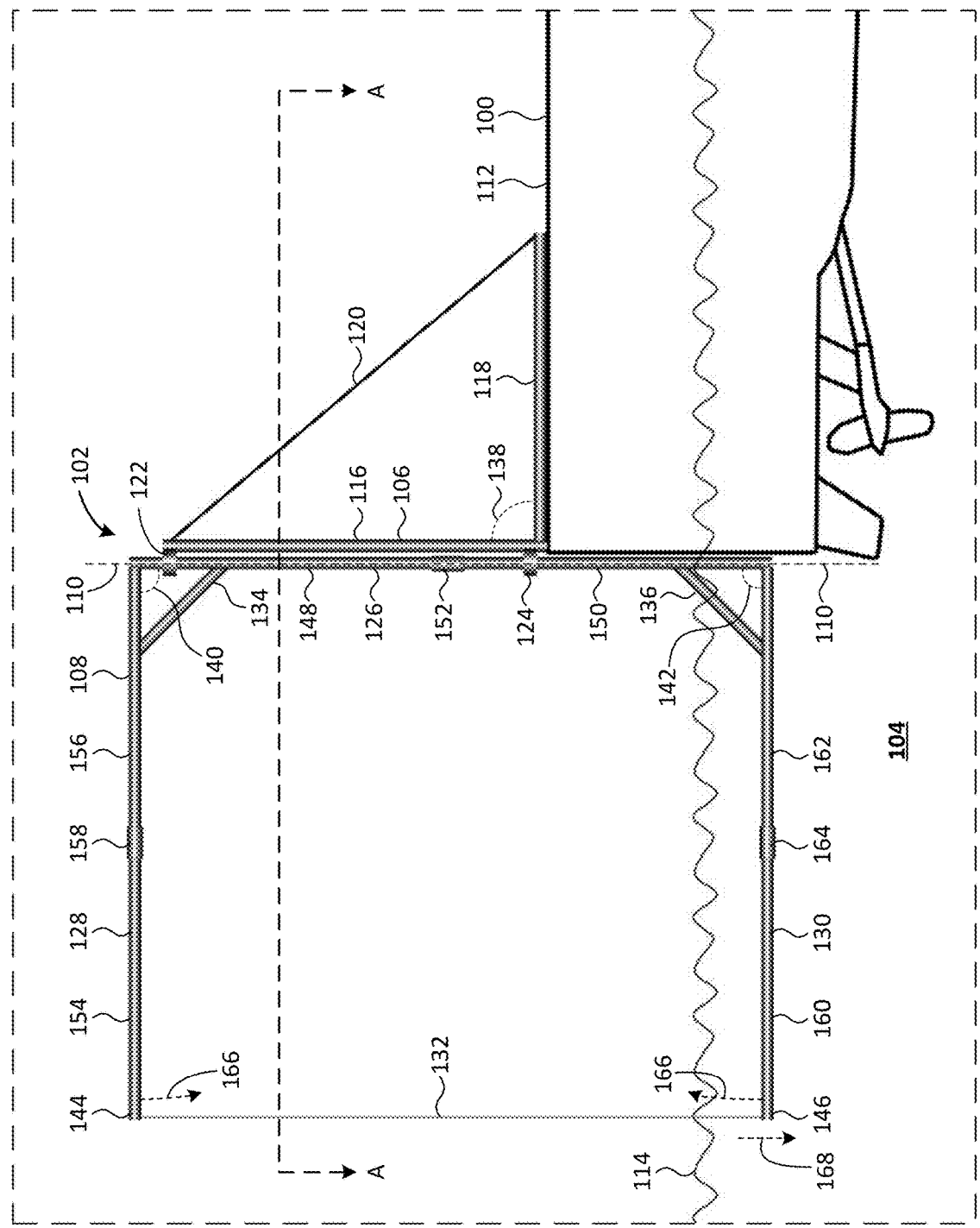
FIG. 1 is a side view of an example marine vessel having an example capture device.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Existing UAV capture systems are heavy and complex structures that rely on unyielding strength as a mechanism to capture the UAV. Such capture systems are typically assembled, deployed and operated by a relatively large team of individuals, often requiring motor assist to raise the capture system into an operable position. The unyielding strength of such capture systems results in the use of heavy structural members. These heavy structural members are typically attached to a heavy base. Since these capture systems have unyielding strength, they necessitate the use of bungees, payout of the capture line, or nets to dissipate the capture energy. While the bungees, payout of capture line, and nets are useful in terms of dissipating the capture energy, implementation of these mechanisms carries certain disadvantages. For example, bungees often cause snap-back of the UAV, which can make the capture process a somewhat unpredictable one as the captured UAV is snapped back and forth. As another example, the payout of the capture line allows for uncontrolled movement of the UAV, which creates a risk of the UAV striking one or more structure(s) of the capture system. Furthermore, bungees and payout of capture line require hardware, such as pulleys and friction braking mechanisms, which adds mechanical complexity and increases the number of components that could potentially fail.

Capture energy can be further dissipated by reducing the relative speed of capture. For example, marine capture of a UAV can occur while the marine vessel is in motion, with the course (e.g., the flight path) of the UAV set in-line and in the same direction as the marine vessel. While this in-line capture procedure reduces the relative speed of the capture (e.g., the speed of the UAV relative to the speed of the marine vessel carrying the capture system) and is accordingly useful in terms of reducing the capture energy, implementation of the in-line capture procedure carries certain disadvantages. For example, placing the UAV in-line with the marine vessel creates a risk of the UAV striking one or more structure(s) of the marine vessel in the event of a failed capture.

Unlike the existing capture systems described above, the apparatus and methods disclosed herein provide for marine capture of a UAV using water for braking and damping. More specifically, the apparatus and methods disclosed herein implement capture devices that, when mounted to and/or otherwise deployed aboard a marine vessel, include a capture frame having a braking member and/or a damping member that is/are submerged in the body of water within which the marine vessel is located. The capture frame is rotatably coupled to a mounting frame of the capture device. The mounting frame secures the capture device to the marine vessel. In connection with the capture device capturing a UAV, the capture frame rotates relative to the mounting frame, and a lower boom of the capture frame flexes toward an upper boom of the capture frame. Rotation of the capture frame relative to the mounting frame is opposed by a braking force applied to the submerged braking member of the capture frame by the body of water surrounding the marine vessel. Flexure of the lower boom of the capture frame relative to the upper boom of the capture frame is opposed by a damping force applied to the submerged damping member of the capture frame by the body of water surrounding the marine vessel. In some examples, the submerged braking member and/or the submerged damping member of the capture frame can be implemented by a lower boom of the capture frame. In other examples, the submerged braking member of the capture frame can be implemented by a rudder of the capture frame, and the submerged damping member can be implemented by a foil of the capture frame. In some such other examples, the rudder is flexible, and the flexibility of the rudder naturally limits the amount of applied braking force in order to advantageously reduce peak braking forces. The flexibility of the rudder accordingly provides for mechanical simplicity.

Resistance from water provides a perfectly even drag force with no elasticity. Such resistance accordingly provides an opportunity for implementing smooth braking and non-spring damping of a capture frame of a capture device in connection with the capture device capturing a UAV. By using water for braking and damping the capture of the UAV, the disclosed capture devices advantageously eliminate the need for additional capture energy dissipation mechanisms such as the bungees and capture line payout of the existing capture systems described above. Eliminating the use of bungees and/or capture line payout advantageously reduces (e.g., eliminates) the risk of the UAV inadvertently striking the vertical structures of the capture device in connection with the UAV being captured, and also advantageously improves the predictability of the post-capture UAV movement and/or the predictability of the capture process in general.

As a further benefit of using water for braking and damping the capture of the UAV, the disclosed capture devices can advantageously eliminate the need for additional energy-dissipating capture processes such as the in-line capture processes described above where the marine vessel is in motion to reduce the relative speed between the capture devices and the UAV. For example, the disclosed capture devices enable capture of a UAV approaching the marine vessel from a direction that is not in-line with (e.g., a direction that is perpendicular to) the direction of travel of the marine vessel. This direction of approach allows for capture of the UAV while the marine vessel is stationary. An additional benefit of eliminating the in-line capture process is reducing the risk of the UAV inadvertently striking any structures of the marine vessel in the event of a failed capture.

The disclosed capture devices advantageously provide for a gentler (e.g., less strenuous) capture process relative to capture processes provided by the existing capture systems described above. The gentler capture process makes it possible to construct the disclosed capture devices from structural materials and/or components with relatively lower strength requirements, thereby allowing for a relatively compact and lightweight design. Furthermore, the disclosed capture devices can be deliberately designed to flex and yield, making an even lighter design possible.

The disclosed capture devices are less mechanically complex (e.g., have improved mechanical simplicity) relative to the existing capture systems described above, and accordingly do not require additional mechanisms to provide braking and damping. The lack of such additional mechanisms advantageously eliminates their potential for failure, thereby improving overall reliability of the disclosed capture devices. The lack of such additional mechanisms also advantageously eliminates maintenance that would otherwise be necessitated by such additional mechanisms.

The compact and lightweight nature of the disclosed capture devices advantageously allows for such capture devices to be assembled and deployed by a small team without the need for motor assistance. In some examples, one or more structure(s) and/or component(s) of the disclosed capture devices can be formed from multiple jointed segments that can easily be assembled to and/or disassembled from one another, thereby enabling for compact storage (e.g., on-board marine vessel storage) of such capture devices when not in use. The compact and lightweight design of the disclosed capture devices advantageously makes such capture devices usable on marine vessels of all shapes and sizes, including marine vessels of a relatively small size and/or shape with which the above-described existing capture systems may not be suitable for use.

As used herein in the context of describing the orientation of an object, the terms "upward orientation" and/or "upwardly-oriented" encompass orientations in which the object is oriented at an angle ranging from forty-five degrees to one hundred thirty-five degrees relative to a reference surface. For example, an axis of rotation that has an upward orientation and/or is upwardly-oriented relative to a horizontally-oriented surface (e.g., a deck) of a marine vessel, and/or relative to an upper surface of a body of water, can be oriented at an angle ranging from forty-five degrees to one hundred thirty-five degrees relative to the horizontally-oriented surface of the marine vessel, and/or relative to the upper surface of the body of water.

As used herein in the context of describing the position and/or orientation of a first object relative to a second object, the term "substantially parallel" encompasses the term parallel and more broadly encompasses a meaning whereby the first object is positioned and/or oriented relative to the second object at an absolute angle of no more than ten degrees (10°) from parallel. For example, a first axis that is substantially parallel to a second axis is positioned and/or oriented relative to the second axis at an absolute angle of no more than ten degrees (10°) from parallel.

As used herein in the context of describing the position and/or orientation of a first object relative to a second object, the term "substantially perpendicular" encompasses the term perpendicular and more broadly encompasses a meaning whereby the first object is positioned and/or oriented relative to the second object at an absolute angle of no more than ten degrees (10°) from perpendicular. For example, a first axis that is substantially perpendicular to a second axis is positioned and/or oriented relative to the second axis at an absolute angle of no more than ten degrees (10°) from perpendicular.

FIG. 1 is a side view of an example marine vessel 100 having an example capture device 102. The marine vessel 100 of FIG. 1 can be a marine vessel of any type, size and/or shape (e.g., a boat, a ship, a carrier, etc.) that is configured to be located in a body of water. In the illustrated example of FIG. 1, the marine vessel 100 is located in an example body of water 104. The body of water 104 of FIG. 1 can be a body of water of any type, size and/or shape (e.g., a channel, a canal, a river, an estuary, a harbor, a lake, a sea, an ocean, etc.) that is suitable to host the marine vessel 100 traveling through and/or within the body of water.

The capture device 102 of FIG. 1 is coupled to the marine vessel 100 and is configured to capture a UAV. In the illustrated example of FIG. 1, the capture device 102 includes an example mounting frame 106 and an example capture frame 108. The mounting frame 106 of FIG. 1 is coupled (e.g., fixedly coupled) to the marine vessel 100. The capture frame 108 of FIG. 1 is rotatably coupled to the mounting frame 106. The capture frame 108 of FIG. 1 is rotatable relative to the mounting frame 106 of FIG. 1 about an example axis of rotation 110.

In the illustrated example of FIG. 1, the axis of rotation 110 has an upward orientation relative to an example horizontally-oriented surface 112 (e.g., a deck) of the marine vessel 100, and/or relative to an example upper surface 114 of the body of water 104. More specifically, the axis of rotation 110 of FIG. 1 is substantially perpendicular to the horizontally-oriented surface 112 of the marine vessel 100, and/or substantially perpendicular to the upper surface 114 of the body of water 104. In other examples, the axis of rotation 110 can alternatively be positioned at a non-upward orientation relative to the horizontally-oriented surface 112 of the marine vessel 100, and/or relative to the upper surface 114 of the body of water 104.

The mounting frame 106 of the capture device 102 of FIG. 1 includes an example post 116, an example base 118, an example brace 120, an example upper collar 122, and an example lower collar 124. The capture frame 108 of the capture device 102 of FIG. 1 includes an example post 126, an example upper boom 128, and example lower boom 130, an example capture line 132, an example upper brace 134, and an example lower brace 136. In other examples, the mounting frame 106, the capture frame 108 and/or, more generally, the capture device 102 of FIG. 1 can include fewer or additional parts, structures and/or components relative to those identified above. The post 116, the base 118, the brace 120, the upper collar 122, and the lower collar 124 of the mounting frame 106, as well as the post 126, the upper boom 128, the lower boom 130, the upper brace 134, and the lower brace 136 of the capture frame 108, can respectively be implemented as any type(s) of solid or hollowed mechanical structure(s) (e.g., tubes, rods, shafts, pipes, struts, bars, links, beams, plates, etc.) made from any type(s) of material(s) (e.g., metals, plastics, composites, etc.).

The post 116 of the mounting frame 106 of FIG. 1 has an upward orientation when the mounting frame 106 and/or, more generally, the capture device 102 is coupled to the marine vessel 100. For example, as shown in FIG. 1, the post 116 of the mounting frame 106 has an upward orientation relative to the horizontally-oriented surface 112 of the marine vessel 100, and/or relative to the upper surface 114 of the body of water 104. More specifically, the post 116 of the mounting frame 106 is substantially perpendicular to the horizontally-oriented surface 112 of the marine vessel 100, and/or substantially perpendicular to the upper surface 114 of the body of water 104. In other examples, the post 116 of the mounting frame 106 can alternatively be positioned at a non-upward orientation relative to the horizontally-oriented surface 112 of the marine vessel 100, and/or relative to the upper surface 114 of the body of water 104.

In the illustrated example of FIG. 1, the post 116 of the mounting frame 106 is offset (e.g., spaced apart) from and substantially parallel to the axis of rotation 110. In other examples, the post 116 of the mounting frame 106 can alternatively be oriented at an angle relative to the axis of rotation 110 such that the post 116 of the mounting frame 106 is not substantially parallel to the axis of rotation 110. In still other examples, the post 116 of the mounting frame 106 can alternatively be colinear with the axis of rotation 110.

The base 118 of the mounting frame 106 of FIG. 1 couples (e.g., fixedly couples) the mounting frame 106 and/or, more generally, the capture device 102 to the marine vessel. For example, the base 118 of the mounting frame 106 can be mounted, fastened and/or otherwise coupled to a surface (e.g., the horizontally-oriented surface 112) and/or a structure of the marine vessel 100. The base 118 of the mounting frame 106 can include any number (e.g., 1, 2, 3, 4, etc.) of segments coupled to the post 116 of the mounting frame 106, and/or coupled to one another, to facilitate coupling the mounting frame 106 to the marine vessel 100.

The base 118 of the mounting frame 106 of FIG. 1 is coupled (e.g., fixedly coupled) to the post 116 of the mounting frame 106 such that the base 118 of the mounting frame 106 of FIG. 1 is oriented at an example angle 138 relative to the post 116 of the mounting frame 106. In the illustrated example of FIG. 1, the angle 138 between the base 118 of the mounting frame 106 and the post 116 of the mounting frame 106 is approximately ninety degrees. Thus, as shown in FIG. 1, the base 118 of the mounting frame 106 is substantially perpendicular to the post 116 of the mounting frame 106. In other examples, the angle 138 between the base 118 of the mounting frame 106 and the post 116 of the mounting frame 106 can alternatively be greater than or less than the approximately ninety degree angle shown in FIG. 1, such that the base 118 of the mounting frame 106 is not substantially perpendicular to the post 116 of the mounting frame 106.

In some examples, the base 118 of the mounting frame 106 is directly coupled to the marine vessel 100. In some such examples, the post 116 of the mounting frame 106 can also (e.g., independently from the base 118 of the mounting frame 106) be directly coupled to the marine vessel 100. Alternatively, the post 116 of the mounting frame 106 can be coupled to the base 118 of the mounting frame 106 without the post 116 of the mounting frame 106 being directly coupled to the marine vessel 100.

The brace 120 of the mounting frame 106 of FIG. 1 is coupled (e.g., fixedly coupled) to and extends (e.g., diagonally extends) between the post 116 of the mounting frame 106 and the base 118 of the mounting frame 106. In the illustrated example of FIG. 1, the brace 120 is configured and/or oriented to provide structural support between the post 116 and the base 118 of the mounting frame 106. In some examples, the brace 120 of the mounting frame 106 is a rigid structural member configured and/or oriented to prevent (e.g., eliminate) the base 118 of the mounting frame 106 from moving (e.g., flexing or bending) toward and/or away from the post 116 of the mounting frame 106. In other examples, the brace 120 of the mounting frame 106 is a flexible structural member configured and/or oriented to restrict (e.g., limit) the base 118 of the mounting frame 106 from moving (e.g., flexing or bending) toward and/or away from the post 116 of the mounting frame 106. In some examples, the brace 120 can be one of a plurality of braces extending between and/or providing support between the post 116 of the mounting frame 106 and the base 118 of the mounting frame 106.

The upper collar 122 and the lower collar 124 of the mounting frame 106 of FIG. 1 are coupled (e.g., fixedly coupled) to the post 116 of the mounting frame 106. In the illustrated example of FIG. 1, the upper collar 122 is offset (e.g., spaced apart) from the lower collar 124 along the post 116 of the mounting frame 106. In other examples, the upper collar 122 can alternatively be adjacent to (e.g., contact) the lower collar 124. Each of the upper and lower collars 122, 124 of FIG. 1 is configured to receive the post 126 of the capture frame 108 such that the post 126 of the capture frame 108 is rotatably coupled to the upper and lower collars 122, 124 and/or the post 116 of the mounting frame 106. In some examples, each of the upper and lower collars 122, 124 of FIG. 1 includes a bearing configured to receive the post 126 of the capture frame 108, thereby enabling the post 126 of the capture frame 108 to rotate within the upper and lower collars 122, 124 of the mounting frame 106 about the axis of rotation 110, and/or enabling the capture frame 108 to rotate relative to the mounting frame 106. In some examples, the upper and lower collars 122, 124 can be two of a larger plurality of collars (e.g., 3 or more collars) rotatably coupling the post 126 of the capture frame 108 to the collars and/or the post 116 of the mounting frame 106.

The post 126 of the capture frame 108 of FIG. 1 has an upward orientation when the mounting frame 106 and/or, more generally, the capture device 102 is coupled to the marine vessel 100. For example, as shown in FIG. 1, the post 126 of the capture frame 108 has an upward orientation relative to the horizontally-oriented surface 112 of the marine vessel 100, and/or relative to the upper surface 114 of the body of water 104. More specifically, the post 126 of the capture frame 108 is substantially perpendicular to the horizontally-oriented surface 112 of the marine vessel 100, and/or substantially perpendicular to the upper surface 114 of the body of water 104. In other examples, the post 126 of the capture frame 108 can alternatively be positioned at a non-upward orientation relative to the horizontally-oriented surface 112 of the marine vessel 100, and/or relative to the upper surface 114 of the body of water 104.

The post 126 of the capture frame 108 defines (e.g., is colinear with) the axis of rotation 110 about which the capture frame 108 rotates. In the illustrated example of FIG. 1, the post 126 of the capture frame 108 is offset (e.g., spaced apart) from and substantially parallel to the post 116 of the mounting frame 106. In other examples, the post 126 of the capture frame 108 can alternatively be oriented at an angle relative to the post 116 of the mounting frame 106 such that the post 126 of the capture frame 108 is not substantially parallel to the post 116 of the mounting frame 106. In still other examples, the post 126 of the capture frame 108 can alternatively be colinear with the post 116 of the capture frame 108.

The upper boom 128 of the capture frame 108 of FIG. 1 is coupled (e.g., fixedly coupled) to the post 126 of the capture frame 108 such that the upper boom 128 of the capture frame 108 of FIG. 1 is oriented at an example angle 140 relative to the post 126 of the capture frame 108. In the illustrated example of FIG. 1, the angle 140 between the upper boom 128 of the capture frame 108 and the post 126 of the capture frame 108 is approximately ninety degrees. Thus, as shown in FIG. 1, the upper boom 128 of the capture frame 108 is substantially perpendicular to the post 126 of the capture frame 108. In other examples, the angle 140 between the upper boom 128 of the capture frame 108 and the post 126 of the capture frame 108 can alternatively be greater than or less than the approximately ninety degree angle shown in FIG. 1, such that the upper boom 128 of the capture frame 108 is not substantially perpendicular relative to the post 126 of the capture frame 108.

The lower boom 130 of the capture frame 108 of FIG. 1 is coupled (e.g., fixedly coupled) to the post 126 of the capture frame 108 such that the lower boom 130 of the capture frame 108 of FIG. 1 is oriented at an example angle 142 relative to the post 126 of the capture frame 108. In the illustrated example of FIG. 1, the angle 142 between the lower boom 130 of the capture frame 108 and the post 126 of the capture frame 108 is approximately ninety degrees. Thus, as shown in FIG. 1, the lower boom 130 of the capture frame 108 is substantially perpendicular to the post 126 of the capture frame 108. In other examples, the angle 142 between the lower boom 130 of the capture frame 108 and the post 126 of the capture frame 108 can alternatively be greater than or less than the approximately ninety degree angle shown in FIG. 1, such that the lower boom 130 of the capture frame 108 is not substantially perpendicular relative to the post 126 of the capture frame 108.

In the illustrated example of FIG. 1, the capture line 132 of the capture frame 108 is coupled (e.g., fixedly coupled) to and extends between the upper boom 128 and the lower boom 130 of the capture frame 108. More specifically, as shown in FIG. 1, the capture line 132 of the capture frame 108 is coupled to and extends between an example free end 144 of the upper boom 128 of the capture frame 108 and an example free end 146 of the lower boom 130 of the capture frame 108, without slack in the capture line 132. The free end 144 of the upper boom 128 is offset (e.g., spaced apart) from the free end 146 of the lower boom 130 by a distance (e.g., a vertical distance) that is suitable to enable the capture line 132 and/or, more generally, the capture frame 108 of the capture device 102 of FIG. 1 to capture a UAV. Furthermore, the capture line 132 is offset (e.g., spaced apart) from the post 126 of the capture frame 108 by a distance (e.g., a horizontal distance) that is suitable to enable the capture line 132 and/or, more generally, the capture frame 108 of the capture device 102 of FIG. 1 to capture a UAV.

The capture line 132 of the capture frame 108 can be implemented by any flexible and/or cord-like structural member (e.g., a rope, a wire, a string, a band, etc.) that is suitable to be engaged by a hook of a UAV, as further described below. In the illustrated example of FIG. 1, the free end 144 of the upper boom 128 and the free end 146 of the lower boom 130 can flex inwardly toward one another in connection with a UAV engaging the capture line 132 of the capture frame 108. This flexibility of the free end 144 of the upper boom 128 and/or the free end 146 of the lower boom 130 assists the capture frame 108 in absorbing and/or dissipating capture energy associated with the UAV engaging the capture line 132 of the capture frame 108.

The upper brace 134 of the capture frame 108 of FIG. 1 is coupled (e.g., fixedly coupled) to and extends (e.g., diagonally extends) between the post 126 of the capture frame 108 and the upper boom 128 of the capture frame 108. In the illustrated example of FIG. 1, the upper brace 134 is configured and/or oriented to provide structural support between the post 126 and the upper boom 128 of the capture frame 108. In some examples, the upper brace 134 of the capture frame 108 is a rigid structural member configured and/or oriented to prevent (e.g., eliminate) the upper boom 128 of the capture frame 108 from moving (e.g., flexing or bending) toward and/or away from the post 126 of the capture frame 108. In other examples, the upper brace 134 of the capture frame 108 is a flexible structural member configured and/or oriented to restrict (e.g., limit) the upper boom 128 of the capture frame 108 from moving (e.g., flexing or bending) toward and/or away from the post 126 of the capture frame 108. In some examples, the upper brace 134 can be one of a plurality of braces extending between and/or providing support between the post 126 of the capture frame 108 and the upper boom 128 of the capture frame 108.

The lower brace 136 of the capture frame 108 of FIG. 1 is coupled (e.g., fixedly coupled) to and extends (e.g., diagonally extends) between the post 126 of the capture frame 108 and the lower boom 130 of the capture frame 108. In the illustrated example of FIG. 1, the lower brace 136 is configured and/or oriented to provide structural support between the post 126 and the lower boom 130 of the capture frame 108. In some examples, the lower brace 136 of the capture frame 108 is a rigid structural member configured and/or oriented to prevent (e.g., eliminate) the lower boom 130 of the capture frame 108 from moving (e.g., flexing or bending) toward and/or away from the post 126 of the capture frame 108. In other examples, the lower brace 136 of the capture frame 108 is a flexible structural member configured and/or oriented to restrict (e.g., limit) the lower boom 130 of the capture frame 108 from moving (e.g., flexing or bending) toward and/or away from the post 126 of the capture frame 108. In some examples, the lower brace 136 can be one of a plurality of braces extending between and/or providing support between the post 126 of the capture frame 108 and the lower boom 130 of the capture frame 108.

In the illustrated example of FIG. 1, the capture frame 108 has a substantially C-shaped profile formed and/or defined by the post 126, the upper boom 128 and the lower boom 130 of the capture frame 108. Additionally, the capture frame 108 of FIG. 1 has a substantially rectangular profile formed and/or defined by the post 126, the upper boom 128, the lower boom 130 and the capture line 132 of the capture frame 108. In other examples, the capture frame 108 can have a different profile as a result of changes in and/or to the angle 140 between the upper boom 128 and the post 126 and/or the angle 142 between the lower boom 130 and the post 126. For example, increasing both the angle 140 between the upper boom 128 and the post 126 and the angle 142 between the lower boom 130 and the post 126 can provide for a capture frame 108 having a trapezoidal profile formed and/or defined by the post 126, the upper boom 128, the lower boom 130 and the capture line 132 of the capture frame 108.

The post 126, the upper boom 128 and/or the lower boom 130 of the capture frame 108 of FIG. 1 can respectively be formed and/or defined by multiple structural members and/or segments removably coupled to one another via one or more joint(s). For example, the post 126 of the capture frame 108 of FIG. 1 includes an example first segment 148 and an example second segment 150. The first segment 148 is removably coupled to the second segment 150 via an example first joint 152. The upper boom 128 of the capture frame 108 of FIG. 1 includes an example third segment 154 and an example fourth segment 156. The third segment 154 is removably coupled to the fourth segment 156 via an example second joint 158. The lower boom 130 of the capture frame 108 of FIG. 1 includes an example fifth segment 160 and an example sixth segment 162. The fifth segment 160 is removably coupled to the sixth segment 162 via an example third joint 164. In other examples, the post 126, the upper boom 128 and/or the lower boom 130 of capture frame 108 can respectively be formed and/or defined by a different number (e.g., 1, 3, 4, etc.) of structural members and/or segments relative to the respective structural configurations of the post 126, the upper boom 128 and the lower boom 130 shown in FIG. 1 and described above. Thus, the capture frame 108 of FIG. 1 can be formed and/or defined by any number (e.g., 1, 2, 3, 6, etc.) of structural members and/or segments.

In the illustrated example of FIG. 1, the lower boom 130 of the capture frame 108 is submerged in the body of water 104. When submerged in the body of water 104 as shown in FIG. 1, the lower boom 130 operates and/or functions as a braking member that makes use of the body of water 104 surrounding the marine vessel 100 to brake (e.g., decelerate) the rotation of the capture frame 108 relative to the mounting frame 106 in connection with the capture device 102 of the marine vessel 100 capturing a UAV. More specifically, in the illustrated example of FIG. 1, rotation of the capture frame 108 relative to the mounting frame 106 in connection with the capture device 102 of the marine vessel 100 capturing a UAV is opposed by a braking force applied to the submerged lower boom 130 by the body of water 104 surrounding the marine vessel 100.

Figure 2:
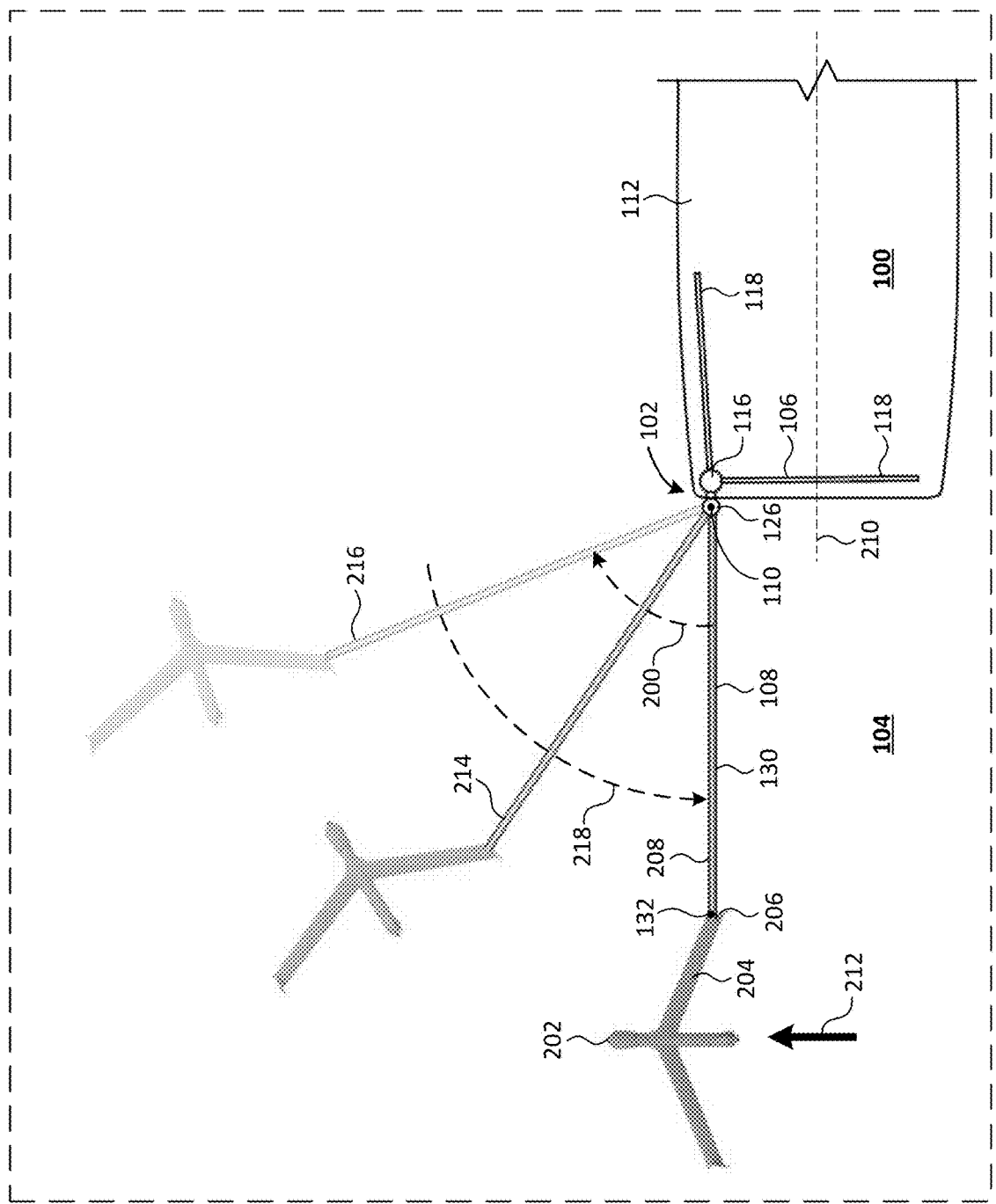
FIG. 2 is a cross-sectional view taken along section A-A of FIG. 1, illustrating example rotational movement of the capture frame of the capture device of FIG. 1 relative to the mounting frame of the capture device of FIG. 1 in connection with the capture device of FIG. 1 capturing an example UAV.

For example, FIG. 2 is a cross-sectional view taken along section A-A of FIG. 1, illustrating example rotational movement 200 of the capture frame 108 of the capture device 102 of FIG. 1 relative to the mounting frame 106 of the capture device 102 of FIG. 1 in connection with the capture device 102 of FIG. 1 capturing an example UAV 202. The UAV 202 of FIG. 2 includes an example wing 204 having an example hook 206 located proximate an outboard area (e.g., a tip) of the wing 204. The hook 206 of the UAV 202 is configured to engage the capture line 132 of the capture frame 108 as the course (e.g., the flight path) of the UAV 202 intersects the location of the capture line 132. In the illustrated example of FIGS. 1 and 2, the capture frame 108 is positioned and/or oriented in an example neutral position 208 in which the upper boom 128 and the lower boom 130 of the capture frame 108 are oriented substantially parallel to an example longitudinal axis 210 of the marine vessel 100, with the upper boom 128 and the lower boom 130 of the capture frame 108 extending rearwardly from the back end of the marine vessel 100, and the lower boom 130 submerged in the body of water 104.

In the illustrated example of FIG. 2, the UAV 202 is shown approaching the marine vessel 100 from an example direction 212 that is substantially perpendicular to the longitudinal axis 210 of the marine vessel 100. The hook 206 of the UAV 202 engages the capture line 132 of the capture frame 108 while the capture frame 108 is positioned in the neutral position 208. This engagement generates a capture force which causes the illustrated rotational movement 200 of the capture frame 108 relative to the mounting frame 106 from the neutral position 208 to one or more rotated position(s) such as the example first rotated position 214, and subsequently the example second rotated position 216 shown in FIG. 2. The illustrated rotational movement 200 of the capture frame 108 relative to the mounting frame 106 is opposed by an example braking force 218 applied to the submerged lower boom 130 of the capture frame 108 by the body of water 104 surrounding the lower boom 130 and/or surrounding the marine vessel 100. The braking force 218 applied to the submerged lower boom 130 advantageously provides for a smooth deceleration of the capture frame 108, and/or for a smooth deceleration of the UAV 202 that is engaged with the capture line 132 of the capture frame 108.

When submerged in the body of water 104 as shown in FIGS. 1 and 2, the lower boom 130 operates and functions not only as a braking member, but also as a damping member that makes use of the body of water 104 surrounding the marine vessel 100 to damp (e.g., reduce oscillatory motion of) the lower boom 130 of the capture frame 108 relative to the upper boom 128 of the capture frame 108 in connection with the capture device 102 of the marine vessel 100 capturing the UAV 202. For example, in addition to causing the rotational movement 200 of the capture frame 108 discussed above, the capture force resulting from the UAV 202 engaging the capture line 132 of the capture frame 108 also causes an example flexure movement 166 whereby the upper boom 128 and the lower boom 130 of the capture frame 108 flex toward one another. The illustrated flexure movement 166 of the lower boom 130 toward the upper boom 128 is opposed by an example damping force 168 applied to the submerged lower boom 130 of the capture frame 108 by the body of water 104 surrounding the lower boom 130 and/or surrounding the marine vessel 100. The damping force 168 applied to the lower boom 130 provides for non-spring damping of the lower boom 130 and/or the upper boom 128 of the capture frame 108, and/or provides for non-spring damping of the UAV 202 that is engaged with the capture line 132 of the capture frame 108.

Figure 3:
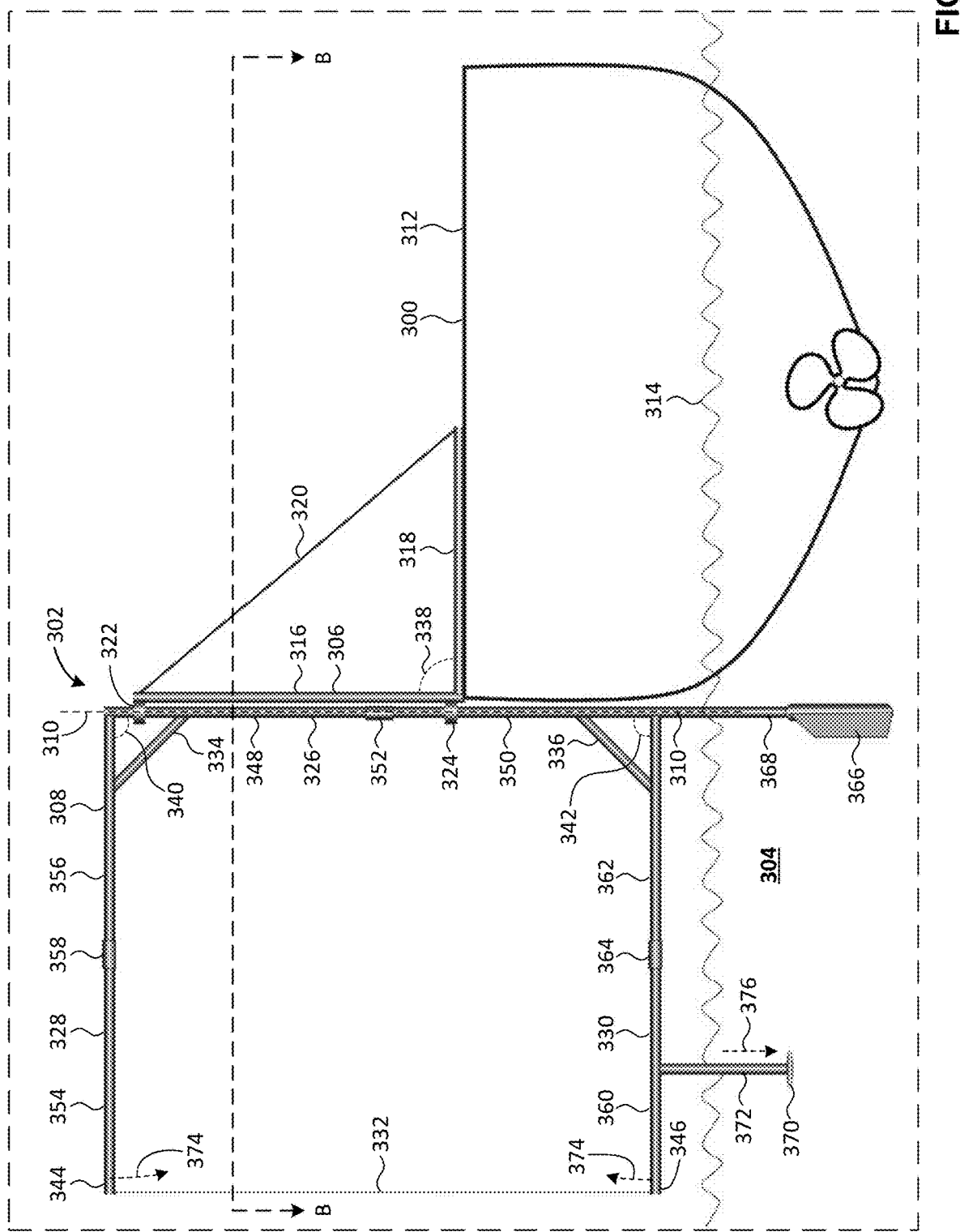
FIG. 3 is a rear view of an example marine vessel having an example capture device.

FIG. 3 is a rear view of an example marine vessel 300 having an example capture device 302. The marine vessel 300 of FIG. 3 can be a marine vessel of any type, size and/or shape (e.g., a boat, a ship, a carrier, etc.) that is configured to be located in a body of water. In the illustrated example of FIG. 3, the marine vessel 300 is located in an example body of water 304. The body of water 304 of FIG. 3 can be a body of water of any type, size and/or shape (e.g., a channel, a canal, a river, an estuary, a harbor, a lake, a sea, an ocean, etc.) that is suitable to host the marine vessel 300 traveling through and/or within the body of water.

The capture device 302 of FIG. 3 is coupled to the marine vessel 300 and is configured to capture a UAV. In the illustrated example of FIG. 3, the capture device 302 includes an example mounting frame 306 and an example capture frame 308. The mounting frame 306 of FIG. 3 is coupled (e.g., fixedly coupled) to the marine vessel 300. The capture frame 308 of FIG. 3 is rotatably coupled to the mounting frame 306. The capture frame 308 of FIG. 3 is rotatable relative to the mounting frame 306 of FIG. 3 about an example axis of rotation 310.

In the illustrated example of FIG. 3, the axis of rotation 310 has an upward orientation relative to an example horizontally-oriented surface 312 (e.g., a deck) of the marine vessel 300, and/or relative to an example upper surface 314 of the body of water 304. More specifically, the axis of rotation 310 of FIG. 3 is substantially perpendicular to the horizontally-oriented surface 312 of the marine vessel 300, and/or substantially perpendicular to the upper surface 314 of the body of water 304. In other examples, the axis of rotation 310 can alternatively be positioned at a non-upward orientation relative to the horizontally-oriented surface 312 of the marine vessel 300, and/or relative to the upper surface 314 of the body of water 304.

The mounting frame 306 of the capture device 302 of FIG. 3 includes an example post 316, an example base 318, an example brace 320, an example upper collar 322, and an example lower collar 324. The capture frame 308 of the capture device 302 of FIG. 3 includes an example post 326, an example upper boom 328, and example lower boom 330, an example capture line 332, an example upper brace 334, and an example lower brace 336. In other examples, the mounting frame 306, the capture frame 308 and/or, more generally, the capture device 302 of FIG. 3 can include fewer or additional parts, structures and/or components relative to those identified above. The post 316, the base 318, the brace 320, the upper collar 322, and the lower collar 324 of the mounting frame 306, as well as the post 326, the upper boom 328, the lower boom 330, the upper brace 334, and the lower brace 336 of the capture frame 308, can respectively be implemented as any type(s) of solid or hollowed mechanical structure(s) (e.g., tubes, rods, shafts, pipes, struts, bars, links, beams, plates, etc.) made from any type(s) of material(s) (e.g., metals, plastics, composites, etc.).

The post 316 of the mounting frame 306 of FIG. 3 has an upward orientation when the mounting frame 306 and/or, more generally, the capture device 302 is coupled to the marine vessel 300. For example, as shown in FIG. 3, the post 316 of the mounting frame 306 has an upward orientation relative to the horizontally-oriented surface 312 of the marine vessel 300, and/or relative to the upper surface 314 of the body of water 304. More specifically, the post 316 of the mounting frame 306 is substantially perpendicular to the horizontally-oriented surface 312 of the marine vessel 300, and/or substantially perpendicular to the upper surface 314 of the body of water 304. In other examples, the post 316 of the mounting frame 306 can alternatively be positioned at a non-upward orientation relative to the horizontally-oriented surface 312 of the marine vessel 300, and/or relative to the upper surface 314 of the body of water 304.

In the illustrated example of FIG. 3, the post 316 of the mounting frame 306 is offset (e.g., spaced apparat) from and substantially parallel to the axis of rotation 310. In other examples, the post 316 of the mounting frame 306 can alternatively be oriented at an angle relative to the axis of rotation 310 such that the post 316 of the mounting frame 306 is not substantially parallel to the axis of rotation 310. In still other examples, the post 316 of the mounting frame 306 can alternatively be colinear with the axis of rotation 310.

The base 318 of the mounting frame 306 of FIG. 3 couples (e.g., fixedly couples) the mounting frame 306 and/or, more generally, the capture device 302 to the marine vessel. For example, the base 318 of the mounting frame 306 can be mounted, fastened and/or otherwise coupled to a surface (e.g., the horizontally-oriented surface 312) and/or a structure of the marine vessel 300. The base 318 of the mounting frame 306 can include any number (e.g., 1, 2, 3, 4, etc.) of segments coupled to the post 316 of the mounting frame 306, and/or coupled to one another, to facilitate coupling the mounting frame 306 to the marine vessel 300.

The base 318 of the mounting frame 306 of FIG. 3 is coupled (e.g., fixedly coupled) to the post 316 of the mounting frame 306 such that the base 318 of the mounting frame 306 of FIG. 3 is oriented at an example angle 338 relative to the post 316 of the mounting frame 306. In the illustrated example of FIG. 3, the angle 338 between the base 318 of the mounting frame 306 and the post 316 of the mounting frame 306 is approximately ninety degrees. Thus, as shown in FIG. 3, the base 318 of the mounting frame 306 is substantially perpendicular to the post 316 of the mounting frame 306. In other examples, the angle 338 between the base 318 of the mounting frame 306 and the post 316 of the mounting frame 306 can alternatively be greater than or less than the approximately ninety degree angle shown in FIG. 3, such that the base 318 of the mounting frame 306 is not substantially perpendicular to the post 316 of the mounting frame 306.

In some examples, the base 318 of the mounting frame 306 is directly coupled to the marine vessel 300. In some such examples, the post 316 of the mounting frame 306 can also (e.g., independently from the base 318 of the mounting frame 306) be directly coupled to the marine vessel 300. Alternatively, the post 316 of the mounting frame 106 can be coupled to the base 318 of the mounting frame 306 without the post 316 of the mounting frame 306 being directly coupled to the marine vessel 300.

The brace 320 of the mounting frame 306 of FIG. 3 is coupled (e.g., fixedly coupled) to and extends (e.g., diagonally extends) between the post 316 of the mounting frame 306 and the base 318 of the mounting frame 306. In the illustrated example of FIG. 3, the brace 320 is configured and/or oriented to provide structural support between the post 316 and the base 318 of the mounting frame 306. In some examples, the brace 320 of the mounting frame 306 is a rigid structural member configured and/or oriented to prevent (e.g., eliminate) the base 318 of the mounting frame 306 from moving (e.g., flexing or bending) toward and/or away from the post 316 of the mounting frame 306. In other examples, the brace 320 of the mounting frame 306 is a flexible structural member configured and/or oriented to restrict (e.g., limit) the base 318 of the mounting frame 306 from moving (e.g., flexing or bending) toward and/or away from the post 316 of the mounting frame 306. In some examples, the brace 320 can be one of a plurality of braces extending between and/or providing support between the post 316 of the mounting frame 306 and the base 318 of the mounting frame 306.

The upper collar 322 and the lower collar 324 of the mounting frame 306 of FIG. 3 are coupled (e.g., fixedly coupled) to the post 316 of the mounting frame 306. In the illustrated example of FIG. 3, the upper collar 322 is offset (e.g., spaced apart) from the lower collar 324 along the post 316 of the mounting frame 306. In other examples, the upper collar 322 can alternatively be adjacent to (e.g., contact) the lower collar 324. Each of the upper and lower collars 322, 324 of FIG. 3 is configured to receive the post 326 of the capture frame 308 such that the post 326 of the capture frame 308 is rotatably coupled to the upper and lower collars 322, 324 and/or the post 316 of the mounting frame 306. In some examples, each of the upper and lower collars 322, 324 of FIG. 3 includes a bearing configured to receive the post 326 of the capture frame 308, thereby enabling the post 326 of the capture frame 308 to rotate within the upper and lower collars 322, 324 of the mounting frame 306 about the axis of rotation 310, and/or enabling the capture frame 308 to rotate relative to the mounting frame 306. In some examples, the upper and lower collars 322, 324 can be two of a larger plurality of collars (e.g., 3 or more collars) rotatably coupling the post 326 of the capture frame 308 to the collars and/or the post 316 of the mounting frame 306.

The post 326 of the capture frame 308 of FIG. 3 has an upward orientation when the mounting frame 306 and/or, more generally, the capture device 302 is coupled to the marine vessel 300. For example, as shown in FIG. 3, the post 326 of the capture frame 308 has an upward orientation relative to the horizontally-oriented surface 312 of the marine vessel 300, and/or relative to the upper surface 314 of the body of water 304. More specifically, the post 326 of the capture frame 308 is substantially perpendicular to the horizontally-oriented surface 312 of the marine vessel 300, and/or substantially perpendicular to the upper surface 314 of the body of water 304. In other examples, the post 326 of the capture frame 308 can alternatively be positioned at a non-upward orientation relative to the horizontally-oriented surface 312 of the marine vessel 300, and/or relative to the upper surface 314 of the body of water 304.

The post 326 of the capture frame 308 defines (e.g., is colinear with) the axis of rotation 310 about which the capture frame 308 rotates. In the illustrated example of FIG. 3, the post 326 of the capture frame 308 is offset (e.g., spaced apart) from and substantially parallel to the post 316 of the mounting frame 306. In other examples, the post 326 of the capture frame 308 can alternatively be oriented at an angle relative to the post 316 of the mounting frame 306 such that the post 326 of the capture frame 308 is not substantially parallel to the post 316 of the mounting frame 306. In still other examples, the post 326 of the capture frame 308 can alternatively be colinear with the post 316 of the capture frame 308.

The upper boom 328 of the capture frame 308 of FIG. 3 is coupled (e.g., fixedly coupled) to the post 326 of the capture frame 308 such that the upper boom 328 of the capture frame 308 of FIG. 3 is oriented at an example angle 340 relative to the post 326 of the capture frame 308. In the illustrated example of FIG. 3, the angle 340 between the upper boom 328 of the capture frame 308 and the post 326 of the capture frame 308 is approximately ninety degrees. Thus, as shown in FIG. 3, the upper boom 328 of the capture frame 308 is substantially perpendicular to the post 326 of the capture frame 308. In other examples, the angle 340 between the upper boom 328 of the capture frame 308 and the post 326 of the capture frame 308 can alternatively be greater than or less than the approximately ninety degree angle shown in FIG. 3, such that the upper boom 328 of the capture frame 308 is not substantially perpendicular relative to the post 326 of the capture frame 308.

The lower boom 330 of the capture frame 308 of FIG. 3 is coupled (e.g., fixedly coupled) to the post 326 of the capture frame 308 such that the lower boom 330 of the capture frame 308 of FIG. 3 is oriented at an example angle 342 relative to the post 326 of the capture frame 308. In the illustrated example of FIG. 3, the angle 342 between the lower boom 330 of the capture frame 308 and the post 326 of the capture frame 308 is approximately ninety degrees. Thus, as shown in FIG. 3, the lower boom 330 of the capture frame 308 is substantially perpendicular to the post 326 of the capture frame 308. In other examples, the angle 342 between the lower boom 330 of the capture frame 308 and the post 326 of the capture frame 308 can alternatively be greater than or less than the approximately ninety degree angle shown in FIG. 3, such that the lower boom 330 of the capture frame 308 is not substantially perpendicular relative to the post 326 of the capture frame 308.

In the illustrated example of FIG. 3, the capture line 332 of the capture frame 308 is coupled (e.g., fixedly coupled) to and extends between the upper boom 328 and the lower boom 330 of the capture frame 308. More specifically, as shown in FIG. 3, the capture line 332 of the capture frame 308 is coupled to and extends between an example free end 344 of the upper boom 328 of the capture frame 308 and an example free end 346 of the lower boom 330 of the capture frame 308, without slack in the capture line 332. The free end 344 of the upper boom 328 is offset (e.g., spaced apart) from the free end 346 of the lower boom 330 by a distance (e.g., a vertical distance) that is suitable to enable the capture line 332 and/or, more generally, the capture frame 308 of the capture device 302 of FIG. 3 to capture a UAV. Furthermore, the capture line 332 is offset (e.g., spaced apart) from the post 326 of the capture frame 308 by a distance (e.g., a horizontal distance) that is suitable to enable the capture line 332 and/or, more generally, the capture frame 308 of the capture device 302 of FIG. 3 to capture a UAV.

The capture line 332 of the capture frame 308 can be implemented by any flexible and/or cord-like structural member (e.g., a rope, a wire, a string, a band, etc.) that is suitable to be engaged by a hook of a UAV, as further described below. In the illustrated example of FIG. 3, the free end 344 of the upper boom 328 and the free end 346 of the lower boom 330 can flex inwardly toward one another in connection with a UAV engaging the capture line 332 of the capture frame 308. The aforementioned flexibility of the free end 344 of the upper boom 328 and/or the free end 346 of the lower boom 330 assists the capture frame 308 in absorbing and/or dissipating capture energy associated with the UAV engaging the capture line 332 of the capture frame 308.

The upper brace 334 of the capture frame 308 of FIG. 3 is coupled (e.g., fixedly coupled) to and extends (e.g., diagonally extends) between the post 326 of the capture frame 308 and the upper boom 328 of the capture frame 308. In the illustrated example of FIG. 3, the upper brace 334 is configured and/or oriented to provide structural support between the post 326 and the upper boom 328 of the capture frame 308. In some examples, the upper brace 334 of the capture frame 308 is a rigid structural member configured and/or oriented to prevent (e.g., eliminate) the upper boom 328 of the capture frame 308 from moving (e.g., flexing or bending) toward and/or away from the post 326 of the capture frame 308. In other examples, the upper brace 334 of the capture frame 308 is a flexible structural member configured and/or oriented to restrict (e.g., limit) the upper boom 328 of the capture frame 308 from moving (e.g., flexing or bending) toward and/or away from the post 326 of the capture frame 308. In some examples, the upper brace 334 can be one of a plurality of braces extending between and/or providing support between the post 326 of the capture frame 308 and the upper boom 328 of the capture frame 308.

The lower brace 336 of the capture frame 308 of FIG. 3 is coupled (e.g., fixedly coupled) to and extends (e.g., diagonally extends) between the post 326 of the capture frame 308 and the lower boom 330 of the capture frame 308. In the illustrated example of FIG. 3, the lower brace 336 is configured and/or oriented to provide structural support between the post 326 and the lower boom 330 of the capture frame 308. In some examples, the lower brace 336 of the capture frame 308 is a rigid structural member configured and/or oriented to prevent (e.g., eliminate) the lower boom 330 of the capture frame 308 from moving (e.g., flexing or bending) toward and/or away from the post 326 of the capture frame 308. In other examples, the lower brace 336 of the capture frame 308 is a flexible structural member configured and/or oriented to restrict (e.g., limit) the lower boom 330 of the capture frame 308 from moving (e.g., flexing or bending) toward and/or away from the post 326 of the capture frame 308. In some examples, the lower brace 336 can be one of a plurality of braces extending between and/or providing support between the post 326 of the capture frame 308 and the lower boom 330 of the capture frame 308.

In the illustrated example of FIG. 3, the capture frame 308 has a substantially C-shaped profile formed and/or defined by the post 326, the upper boom 328 and the lower boom 330 of the capture frame 308. Additionally, the capture frame 308 of FIG. 3 has a substantially rectangular profile formed and/or defined by the post 326, the upper boom 328, the lower boom 330 and the capture line 332 of the capture frame 308. In other examples, the capture frame 308 can have a different profile as a result of changes in and/or to the angle 340 between the upper boom 328 and the post 326 and/or the angle 342 between the lower boom 330 and the post 326. For example, increasing both the angle 340 between the upper boom 328 and the post 326 and the angle 342 between the lower boom 330 and the post 326 would provide for a capture frame 308 having a trapezoidal profile formed and/or defined by the post 326, the upper boom 328, the lower boom 330 and the capture line 332 of the capture frame 308.

The post 326, the upper boom 328 and/or the lower boom 330 of the capture frame 308 of FIG. 3 can respectively be formed and/or defined by multiple structural members and/or segments removably coupled to one another via one or more joint(s). For example, the post 326 of the capture frame 308 of FIG. 3 includes an example first segment 348 and an example second segment 350. The first segment 348 is removably coupled to the second segment 350 via an example first joint 352. The upper boom 328 of the capture frame 308 of FIG. 3 includes an example third segment 354 and an example fourth segment 356. The third segment 354 is removably coupled to the fourth segment 356 via an example second joint 358. The lower boom 330 of the capture frame 308 of FIG. 3 includes an example fifth segment 360 and an example sixth segment 362. The fifth segment 360 is removably coupled to the sixth segment 362 via an example third joint 364. In other examples, the post 326, the upper boom 328 and/or the lower boom 330 of capture frame 308 can respectively be formed and/or defined by a different number (e.g., 1, 3, 4, etc.) of structural members and/or segments relative to the respective structural configurations of the post 326, the upper boom 328 and the lower boom 330 shown in FIG. 3, and described above. Thus, the capture frame 308 of FIG. 3 can be formed and/or defined by any number (e.g., 1, 2, 3, 6, etc.) of structural members and/or segments.

In the illustrated example of FIG. 3, the lower boom 330 of the capture frame 308 is not submerged in the body of water 304, but is instead positioned and/or located above the upper surface 314 of the body of water 304. The capture frame 308 of the capture device 302 of FIG. 3 further includes an example rudder 366, an example rudder support 368, an example foil 370, and an example foil support 372. In the illustrated example of FIG. 3, the rudder 366 is coupled (e.g., fixedly coupled) to the rudder support 368, and the rudder support 368 is coupled (e.g., fixedly coupled) to the post 326 of the capture frame 308. In other examples, the rudder support 368 can alternatively be coupled (e.g., fixedly coupled) to the lower boom 330 of the capture frame 308. As further shown in FIG. 3, the foil 370 is coupled (e.g., fixedly coupled) to the foil support 372, and the foil support 372 is coupled to the lower boom 330 of the capture frame 308.

In the illustrated example of FIG. 3, the rudder support 368 extends downwardly from the post 326 and/or the lower boom 330 of the capture frame 308 into the body of water 304, and the rudder 366 is submerged in the body of water 304. When submerged in the body of water 304 as shown in FIG. 3, the rudder 366 operates and/or functions as a braking member that makes use of the body of water 304 surrounding the marine vessel 300 to brake (e.g., decelerate) the rotation of the capture frame 308 relative to the mounting frame 306 in connection with the capture device 302 of the marine vessel 300 capturing a UAV. More specifically, in the illustrated example of FIG. 3, rotation of the capture frame 308 relative to the mounting frame 306 in connection with the capture device 302 of the marine vessel 300 capturing a UAV is opposed by a braking force applied to the submerged rudder 366 by the body of water 304 surrounding the marine vessel 300.

Figure 4:
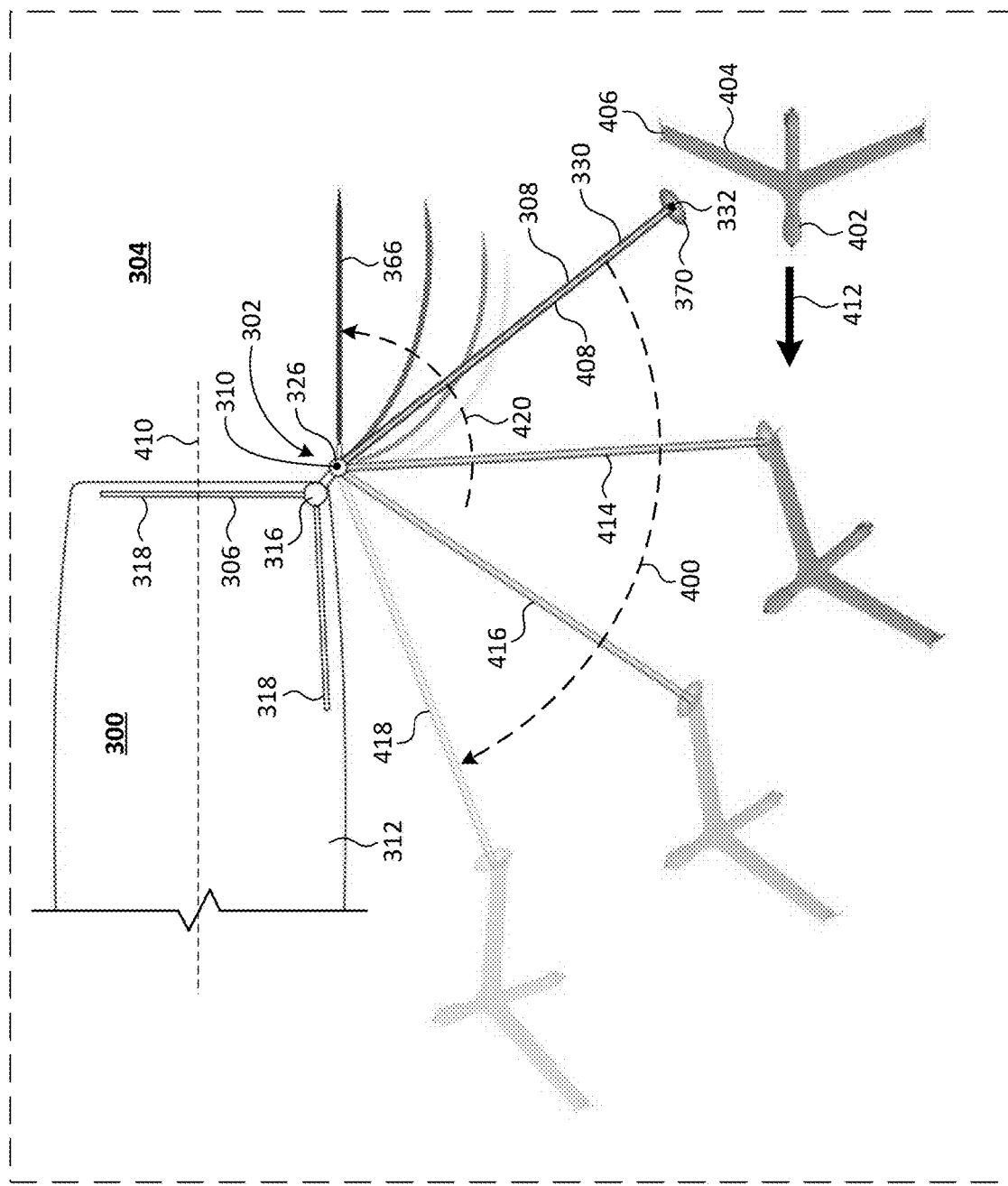
FIG. 4 is a cross-sectional view taken along section B-B of FIG. 3, illustrating example rotational movement of the capture frame of the capture device of FIG. 3 relative to the mounting frame of the capture device of FIG. 3 in connection with the capture device of FIG. 3 capturing an example UAV.

For example, FIG. 4 is a cross-sectional view taken along section B-B of FIG. 3, illustrating example rotational movement 400 of the capture frame 308 of the capture device 302 of FIG. 3 relative to the mounting frame 306 of the capture device 302 of FIG. 3 in connection with the capture device 302 of FIG. 3 capturing an example UAV 402. The UAV 402 of FIG. 4 includes an example wing 404 having an example hook 406 located proximate an outboard area (e.g., a tip) of the wing 404. The hook 406 of the UAV 402 is configured to engage the capture line 332 of the capture frame 308 as the course (e.g., the flight path) of the UAV 402 intersects the location of the capture line 332. In the illustrated example of FIGS. 3 and 4, the capture frame 308 is positioned and/or oriented in an example neutral position 408 in which the upper boom 328 and the lower boom 330 of the capture frame 308 are oriented at a non-parallel angle relative to an example longitudinal axis 410 of the marine vessel 300, with the upper boom 328 and the lower boom 330 of the capture frame 308 extending diagonally (e.g., laterally and rearwardly) from the left side and the back end of the marine vessel 300, and with the rudder 366 submerged in the body of water 304 and extending rearwardly from the back end of the marine vessel 300.

In the illustrated example of FIG. 4, the UAV 402 is shown approaching the marine vessel 300 from an example direction 412 that is substantially parallel to the longitudinal axis 410 of the marine vessel 300. The hook 406 of the UAV 402 engages the capture line 332 of the capture frame 308 while the capture frame 308 is positioned in the neutral position 408. This engagement generates a capture force which causes the illustrated rotational movement 400 of the capture frame 308 relative to the mounting frame 306 from the neutral position 408 to one or more rotated position(s) such as the example first rotated position 414, the example second rotated position 416, and the example third rotated position 418 shown in FIG. 4. The illustrated rotational movement 400 of the capture frame 308 relative to the mounting frame 306 is opposed by an example braking force 420 applied to the submerged rudder 366 of the capture frame 308 by the body of water 304 surrounding the rudder 366 and/or surrounding the marine vessel 300. The braking force 420 applied to the submerged rudder 366 advantageously provides for a smooth deceleration of the capture frame 308, and/or for a smooth deceleration of the UAV 402 that is engaged with the capture line 332 of the capture frame 308.

In the illustrated example of FIGS. 3 and 4, the rudder 366 of the capture frame 308 is flexible. The rudder 366 flexes (e.g., bends or curves) in response to applied torsional forces. For example, increasing the torsional force applied to the rudder 366 increases the extent of flexure of the rudder 366 (e.g., relative to the rudder 366 being straight) and decreases the applied braking force the rudder 366 exerts on the capture frame 308. Conversely, decreasing the torsional force applied to the rudder 366 decreases the extent of flexure of the rudder 366 and increases the applied braking force the rudder 366 exerts on the capture frame 308. The flexibility of the rudder 366 advantageously enables the rudder 366 to self-adjust the applied braking force associated with capturing the UAV 402.

For example, in a static capture scenario (e.g., when the marine vessel 300 is not in motion), the rudder 366 and/or, more generally, the capture frame 308 of FIGS. 3 and 4 experiences the greatest applied braking force when the UAV 402 first engages the capture line 332 of the capture frame 308. Absent the rudder 366 of FIGS. 3 and 4 being flexible, both the capture frame 308 and the UAV 402 might experience a maximum applied braking force that is excessive. Making the rudder 366 flexible, however, enables the rudder 366 to self-adjust the applied braking force to provide an applied braking force that is relatively more constant and/or not excessive. For example, in a static capture scenario, the rudder 366 flexes the most (e.g., has the greatest curvature) in response to the UAV 402 first engaging the capture line 332 of the capture frame 308 when the capture frame 308 is in the neutral position 408. The rate of braking of the capture frame 308 subsequently decreases as the capture frame 308 rotates toward the first rotated position 414, the second rotated position 416, and/or the third rotated position 418 shown in FIG. 4. As the rate of braking decreases, the extent of flexure of the rudder 366 also decreases. Thus, in a static capture scenario, the rudder 366 becomes straighter and/or less flexed as the capture frame 308 rotates toward the first rotated position 414, the second rotated position 416, and/or the third rotated position 418 shown in FIG. 4.

In a dynamic capture scenario (e.g., when the marine vessel 300 is in motion), the orientation of the rudder 366 of the capture frame 308 of FIGS. 3 and 4 becomes increasingly perpendicular to the direction of travel of the marine vessel 300 of FIGS. 3 and 4 within the body of water 304 as the capture frame 308 rotates away from the neutral position 408 and toward the first rotated position 414, the second rotated position 416, and/or the third rotated position 418 shown in FIG. 4. Absent the rudder 366 of FIGS. 3 and 4 being flexible, the rudder 366 would experience an increased flow of water and, therefore, an increased applied braking force as the capture frame 308 rotates toward the first rotated position 414, the second rotated position 416, and/or the third rotated position 418 shown in FIG. 4. Making the rudder 366 flexible, however, enables the rudder 366 to self-adjust the applied braking force to provide an applied braking force that is relatively more constant. For example, as shown in FIG. 4, the extent of flexure of the rudder 366 increases as the capture frame 308 rotates away from the neutral position 408 and toward the first rotated position 414, the second rotated position 416, and/or the third rotated position 418. The increasing flexure of the rudder 366 as shown in FIG. 4 results from increasing torsional forces applied to the rudder 366 as the capture frame 308 rotates away from the neutral position 408 and toward the first rotated position 414, the second rotated position 416, and/or the third rotated position 418 while the marine vessel 300 is in motion within the body of water 304.

In the illustrated example of FIGS. 3 and 4, the foil support 372 extends downwardly from the lower boom 330 of the capture frame 308 into the body of water 304, and the foil 370 is submerged in the body of water 304. When submerged in the body of water 304 as shown in FIGS. 3 and 4, the foil 370, which is oriented substantially parallel to the lower boom 330, operates and functions as a damping member that makes use of the body of water 304 surrounding the marine vessel 300 to damp (e.g., reduce oscillatory motion of) the lower boom 330 of the capture frame 308 relative to the upper boom 328 of the capture frame 308 in connection with the capture device 302 of the marine vessel 300 capturing the UAV 402. For example, in addition to causing the rotational movement 400 of the capture frame 308 discussed above, the capture force resulting from the UAV 402 engaging the capture line 332 of the capture frame 308 also causes an example flexure movement 374 whereby the upper boom 328 and the lower boom 330 of the capture frame 308 flex toward one another. The illustrated flexure movement 374 of the lower boom 330 toward the upper boom 328 is opposed by an example damping force 376 applied to the foil 370 of the capture frame 308 by the body of water 304 surrounding the lower boom 330 and/or surrounding the marine vessel 300. The damping force 376 applied to the foil 370 provides for non-spring damping of the lower boom 330 and/or the upper boom 328 of the capture frame 308, and/or provides for non-spring damping of the UAV 402 that is engaged with the capture line 332 of the capture frame 308.

From the foregoing, it will be appreciated that the disclosed apparatus and methods provide for marine capture of a UAV using water for braking and damping. More specifically, the disclosed apparatus and methods implement capture devices that, when mounted to and/or otherwise deployed aboard a marine vessel, include a capture frame having a braking member and/or a damping member that is/are submerged in the body of water within which the marine vessel is located. The capture frame is rotatably coupled to a mounting frame of the capture device. The mounting frame secures the capture device to the marine vessel. In connection with the capture device capturing a UAV, the capture frame rotates relative to the mounting frame, and a lower boom of the capture frame flexes toward an upper boom of the capture frame. Rotation of the capture frame relative to the mounting frame is opposed by a braking force applied to the submerged braking member of the capture frame by the body of water surrounding the marine vessel. Flexure of the lower boom of the capture frame relative to the upper boom of the capture frame is opposed by a damping force applied to the submerged damping member of the capture frame by the body of water surrounding the marine vessel.

In some examples, the submerged braking member and/or the submerged damping member of the capture frame can be implemented by a lower boom of the capture frame. In other examples, the submerged braking member of the capture frame can be implemented by a rudder of the capture frame, and the submerged damping member can be implemented by a foil of the capture frame. In some such other examples, the rudder is flexible, and the flexibility of the rudder naturally limits the amount of applied braking force in order to advantageously reduce peak braking forces. The flexibility of the rudder accordingly provides for mechanical simplicity.

By using water for braking and damping the capture of the UAV, the disclosed capture devices advantageously eliminate the need for additional capture energy dissipation mechanisms such as the bungees and capture line payout of the existing capture systems described above. Eliminating the use of bungees and/or capture line payout advantageously reduces (e.g., eliminates) the risk of the UAV inadvertently striking the vertical structures of the capture device in connection with the UAV being captured, and also advantageously improves the predictability of the post-capture UAV movement and/or the predictability of the capture process in general.

As a further benefit of using water for braking and damping the capture of the UAV, the disclosed capture devices can advantageously eliminate the need for additional energy-dissipating capture processes such as the in-line capture processes described above where the marine vessel is in motion to reduce the relative speed between the capture devices and the UAV. For example, the disclosed capture devices enable capture of a UAV approaching the marine vessel from a direction that is not in-line with (e.g., a direction that is perpendicular to) the direction of travel of the marine vessel. This direction of approach allows for capture of the UAV while the marine vessel is stationary. An additional benefit of eliminating the in-line capture process is reducing the risk of the UAV inadvertently striking any structures of the marine vessel in the event of a failed capture.

The disclosed capture devices advantageously provide for a gentler (e.g., less strenuous) capture process relative to capture processes provided by the existing capture systems described above. The gentler capture process makes it possible to construct the disclosed capture devices from structural materials and/or components with relatively lower strength requirements, thereby allowing for a relatively compact and lightweight design. Furthermore, the disclosed capture devices can be deliberately designed to flex and yield, making an even lighter design possible.

The disclosed capture devices are less mechanically complex (e.g., have improved mechanical simplicity) relative to the existing capture systems described above, and accordingly do not require additional mechanisms to provide braking and damping. The lack of such additional mechanisms advantageously eliminates their potential for failure, thereby improving overall reliability of the disclosed capture devices. The lack of such additional mechanisms also advantageously eliminates maintenance that would otherwise be necessitated by such additional mechanisms.

The compact and lightweight nature of the disclosed capture devices advantageously allows for such capture devices to be assembled and deployed by a small team without the need for motor assistance. In some examples, one or more structure(s) and/or component(s) of the disclosed capture devices can be formed from multiple jointed segments that can easily be assembled to and/or disassembled from one another, thereby enabling for compact storage (e.g., on-board marine vessel storage) of such capture devices when not in use. The compact and lightweight design of the disclosed capture devices advantageously makes such capture devices usable on marine vessels of all shapes and sizes, including marine vessels of a relatively small size and/or shape with which the above-described existing capture systems may not be suitable for use.

In some examples, a capture device for capturing an unmanned aerial vehicle (UAV) aboard a marine vessel located in a body of water is disclosed. In some disclosed examples, the capture device comprises a mounting frame and a capture frame. In some disclosed examples, the mounting frame is configured to be coupled to the marine vessel. In some disclosed examples the capture frame is configured to be rotatably coupled to the mounting frame. In some disclosed examples, the capture frame is rotatable relative to the mounting frame about an axis of rotation. In some disclosed examples, the capture frame includes a braking member configured to be submerged in the body of water. In some disclosed examples, the braking member is configured to oppose rotation of the capture frame relative to the mounting frame based on a braking force to be applied to the braking member by the body of water.

In some disclosed examples, the mounting frame includes a post. In some disclosed examples, the axis of rotation is offset from and substantially parallel to the post.

In some disclosed examples, the mounting frame includes a collar coupled to the post. In some disclosed examples, the collar is configured to receive the capture frame to rotatably couple the capture frame to the mounting frame.

In some disclosed examples, the capture frame includes a post, an upper boom coupled to the post, a lower boom coupled to the post, and a capture line extending between the upper boom and the lower boom. In some disclosed examples, the post defines the axis of rotation. In some disclosed examples, the upper boom is oriented at a first angle relative to the post. In some disclosed examples, the lower boom is oriented at a second angle relative to the post. In some disclosed examples, the capture line is offset from the post.

In some disclosed examples, the post, the upper boom and the lower boom form a substantially C-shaped portion of the capture frame.

In some disclosed examples, the lower boom is the braking member. In some disclosed examples, rotation of the capture frame relative to the mounting frame in connection with the capture device capturing the UAV is to be opposed by the braking force to be applied to the lower boom by the body of water.

In some disclosed examples, movement of the lower boom relative to the upper boom in connection with the capture device capturing the UAV is to be opposed by a damping force to be applied to the lower boom by the body of water.

In some disclosed examples, the upper boom and the lower boom are configured to be oriented substantially parallel to a longitudinal axis of the marine vessel prior to the capture device capturing the UAV.

In some disclosed examples, the capture frame includes a rudder. In some disclosed examples, the rudder is the braking member. In some disclosed examples, rotation of the capture frame relative to the mounting frame in connection with the capture device capturing the UAV is to be opposed by the braking force to be applied to the rudder by the body of water.

In some disclosed examples, the rudder is flexible. In some disclosed examples, flexing of the rudder is to adjust the braking force.

In some disclosed examples, the capture frame includes a foil coupled to the lower boom and configured to be submerged in the body of water. In some disclosed examples, movement of the lower boom relative to the upper boom in connection with the capture device capturing the UAV is to be opposed by a damping force to be applied to the foil by the body of water.

In some examples, a method for capturing an unmanned aerial vehicle (UAV) aboard a marine vessel located in a body of water is disclosed. In some disclosed examples, the method comprises capturing the UAV with a capture device including a mounting frame and a capture frame. In some disclosed examples, the mounting frame is coupled to the marine vessel. In some disclosed examples, the capture frame is rotatably coupled to the mounting frame. In some disclosed examples, the capture frame is rotatable relative to the mounting frame about an axis of rotation. In some disclosed examples, the capture frame includes a braking member submerged in the body of water. In some disclosed examples, the braking member opposes rotation of the capture frame relative to the mounting frame based on a braking force applied to the braking member by the body of water.

In some disclosed examples, the mounting frame includes a post. In some disclosed examples, the axis of rotation is offset from and substantially parallel to the post.

In some disclosed examples, the mounting frame includes a collar coupled to the post. In some disclosed examples, the collar receives the capture frame to rotatably couple the capture frame to the mounting frame.

In some disclosed examples, the capture frame includes a post, an upper boom coupled to the post, a lower boom coupled to the post, and a capture line extending between the upper boom and the lower boom. In some disclosed examples, the post defines the axis of rotation. In some disclosed examples, the upper boom is oriented at a first angle relative to the post. In some disclosed examples, the lower boom is oriented at a second angle relative to the post. In some disclosed examples, the capture line is offset from the post.

In some disclosed examples, the post, the upper boom and the lower boom form a substantially C-shaped portion of the capture frame.

In some disclosed examples, the lower boom is the braking member. In some disclosed examples, rotation of the capture frame relative to the mounting frame in connection with the capture device capturing the UAV is opposed by the braking force applied to the lower boom by the body of water.

In some disclosed examples, movement of the lower boom relative to the upper boom in connection with the capture device capturing the UAV is opposed by a damping force applied to the lower boom by the body of water.

In some disclosed examples, the upper boom and the lower boom are oriented substantially parallel to a longitudinal axis of the marine vessel prior to the capture device capturing the UAV.

In some disclosed examples, the capture frame includes a rudder. In some disclosed examples, the rudder is the braking member. In some disclosed examples, rotation of the capture frame relative to the mounting frame in connection with the capture device capturing the UAV is opposed by the braking force applied to the rudder by the body of water.

In some disclosed examples, the rudder is flexible. In some disclosed examples, flexing the rudder adjusts the braking force.

In some disclosed examples, the capture frame includes a foil coupled to the lower boom and submerged in the body of water. In some disclosed examples, movement of the lower boom relative to the upper boom in connection with the capture device capturing the UAV is opposed by a damping force applied to the foil by the body of water.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A capture device for capturing an unmanned aerial vehicle (UAV) aboard a marine vessel located in a body of water, the capture device comprising:
    a mounting frame configured to be coupled to the marine vessel; and
    a capture frame configured to be rotatably coupled to the mounting frame, the capture frame being rotatable relative to the mounting frame about an axis of rotation, the capture frame including:
        a post defining the axis of rotation;
        an upper boom coupled to the post, the upper boom oriented at a first angle relative to the post;
        a lower boom coupled to the post, the lower boom oriented at a second angle relative to the post, the lower boom configured to be submerged in the body of water; and
        a capture line extending between the upper boom and the lower boom, the capture line offset from the post;
    wherein the lower boom is configured to oppose rotation of the capture frame relative to the mounting frame based on a braking force to be applied to the lower boom by the body of water in connection with the capture device capturing the UAV.

2. The capture device of claim 1, wherein the post of the capture frame is a first post, and wherein the mounting frame includes a second post, the axis of rotation being offset from and substantially parallel to the second post.

3. The capture device of claim 2, wherein the mounting frame includes a collar coupled to the second post, the collar configured to receive the first post to rotatably couple the capture frame to the mounting frame.

4. The capture device of claim 1, wherein the post, the upper boom and the lower boom form a substantially C-shaped portion of the capture frame.

5. The capture device of claim 1, wherein movement of the lower boom relative to the upper boom in connection with the capture device capturing the UAV is to be opposed by a damping force to be applied to the lower boom by the body of water.

6. The capture device of claim 1, wherein the upper boom and the lower boom are configured to be oriented substantially parallel to a longitudinal axis of the marine vessel prior to the capture device capturing the UAV.

7. A capture device for capturing an unmanned aerial vehicle (UAV) aboard a marine vessel located in a body of water, the capture device comprising:
    a mounting frame configured to be coupled to the marine vessel; and
    a capture frame configured to be rotatably coupled to the mounting frame, the capture frame being rotatable relative to the mounting frame about an axis of rotation, the capture frame including:
        a post defining the axis of rotation;
        an upper boom coupled to the post, the upper boom oriented at a first angle relative to the post;
        a lower boom coupled to the post, the lower boom oriented at a second angle relative to the post;
        a capture line extending between the upper boom and the lower boom, the capture line offset from the post; and
        a rudder configured to be submerged in the body of water, wherein the rudder is configured to oppose rotation of the capture frame relative to the mounting frame based on a braking force to be applied to the rudder by the body of water in connection with the capture device capturing the UAV.

8. The capture device of claim 7, wherein the rudder is flexible, and wherein flexing of the rudder is to adjust the braking force.

9. The capture device of claim 7, wherein the capture frame includes a foil coupled to the lower boom and configured to be submerged in the body of water, and wherein movement of the lower boom relative to the upper boom in connection with the capture device capturing the UAV is to be opposed by a damping force to be applied to the foil by the body of water.

10. The capture device of claim 7, wherein the post of the capture frame is a first post, and wherein the mounting frame includes a second post, the axis of rotation being offset from and substantially parallel to the second post.

11. The capture device of claim 10, wherein the mounting frame includes a collar coupled to the second post, the collar configured to receive the first post to rotatably couple the capture frame to the mounting frame.

12. The capture device of claim 7, wherein the post, the upper boom and the lower boom form a substantially C-shaped portion of the capture frame.

13. The capture device of claim 7, wherein the upper boom and the lower boom are configured to be oriented at a non-parallel angle relative to a longitudinal axis of the marine vessel prior to the capture device capturing the UAV.

14. A method for capturing an unmanned aerial vehicle (UAV) aboard a marine vessel located in a body of water, the method comprising:
    capturing the UAV with a capture device including a mounting frame and a capture frame, the mounting frame coupled to the marine vessel, the capture frame rotatably coupled to the mounting frame, the capture frame being rotatable relative to the mounting frame about an axis of rotation, the capture frame including:
        a post defining the axis of rotation;
        an upper boom coupled to the post, the upper boom oriented at a first angle relative to the post;
        a lower boom coupled to the post, the lower boom oriented at a second angle relative to the post, the lower boom submerged in the body of water; and
        a capture line extending between the upper boom and the lower boom, the capture line offset from the post;
    wherein the lower boom opposes rotation of the capture frame relative to the mounting frame based on a braking force applied to the lower boom by the body of water in connection with the capture device capturing the UAV.

15. The method of claim 14, wherein the post, the upper boom and the lower boom form a substantially C-shaped portion of the capture frame.

16. The method of claim 14, wherein movement of the lower boom relative to the upper boom in connection with the capture device capturing the UAV is opposed by a damping force applied to the lower boom by the body of water.

17. The method of claim 14, wherein the upper boom and the lower boom are oriented substantially parallel to a longitudinal axis of the marine vessel prior to the capture device capturing the UAV.

18. A method for capturing an unmanned aerial vehicle (UAV) aboard a marine vessel located in a body of water, the method comprising:
   capturing the UAV with a capture device including a mounting frame and a capture frame, the mounting frame coupled to the marine vessel, the capture frame rotatably coupled to the mounting frame, the capture frame being rotatable relative to the mounting frame about an axis of rotation, the capture frame including:
   a post defining the axis of rotation;
   an upper boom coupled to the post, the upper boom oriented at a first angle relative to the post;
   a lower boom coupled to the post, the lower boom oriented at a second angle relative to the post;
   a capture line extending between the upper boom and the lower boom, the capture line offset from the post; and
   a rudder submerged in the body of water, wherein the rudder opposes rotation of the capture frame relative to the mounting frame based on a braking force applied to the rudder by the body of water in connection with the capture device capturing the UAV.

19. The method of claim 18, wherein the rudder is flexible, and wherein flexing the rudder adjusts the braking force.

20. The method of claim 18, wherein the capture frame includes a foil coupled to the lower boom and submerged in the body of water, and wherein movement of the lower boom relative to the upper boom in connection with the capture device capturing the UAV is opposed by a damping force applied to the foil by the body of water.

* * * * *

UNITED STATES PATENT AND TRADEMARK OFFICE
CERTIFICATE OF CORRECTION

PATENT NO. : 11,332,262 B2
APPLICATION NO. : 16/404039
DATED : May 17, 2022
INVENTOR(S) : Jesse D. Kiewit and John Richard Wong It is certified that error appears in the above-identified patent and that said Letters Patent is hereby corrected as shown below:

On the Title Page

Item (73) (Assignee), replace "THE BOEING COMPANY, Chicago, IL (US)" with --INSITU, INC., A SUBSIDIARY OF THE BOEING COMPANY, Bingen, WA (US)--

Signed and Sealed this
Fifteenth Day of August, 2023

Katherine Kelly Vidal
*Director of the United States Patent and Trademark Office*